United States Patent
Zhou et al.

(10) Patent No.: US 8,000,497 B2
(45) Date of Patent: Aug. 16, 2011

(54) FAST DETECTION OF LEFT VENTRICLE AND ITS CONFIGURATION IN 2D/3D ECHOCARDIOGRAM USING PROBABILISTIC BOOSTING NETWORK

(75) Inventors: Shaohua Kevin Zhou, Plainsboro, NJ (US); Jingdan Zhang, Plainsboro, NJ (US); Bogdan Georgescu, Plainsboro, NJ (US); Dorin Comaniciu, Princeton Junction, NJ (US)

(73) Assignee: Siemens Corporation, Iselin, NJ (US)

( * ) Notice: Subject to any disclaimer, the term of this patent is extended or adjusted under 35 U.S.C. 154(b) by 973 days.

(21) Appl. No.: 11/872,972

(22) Filed: Oct. 16, 2007

(65) Prior Publication Data

US 2008/0107302 A1    May 8, 2008

Related U.S. Application Data

(60) Provisional application No. 60/829,936, filed on Oct. 18, 2006.

(51) Int. Cl.
*G06K 9/00* (2006.01)
*G06K 9/62* (2006.01)

(52) U.S. Cl. ........................................ 382/103; 382/224

(58) Field of Classification Search .................. 382/103, 382/128, 151, 224, 291, 159
See application file for complete search history.

(56) References Cited

U.S. PATENT DOCUMENTS

| 7,099,510 | B2 | 8/2006 | Jones et al. | |
| 7,555,151 | B2 * | 6/2009 | Comaniciu et al. | 382/128 |
| 7,706,603 | B2 * | 4/2010 | Najafi et al. | 382/154 |
| 7,876,965 | B2 * | 1/2011 | Ai et al. | 382/226 |

OTHER PUBLICATIONS

Viola, P., Jones, M.: Rapid object detecting using a boosted cascade of simple features. In: Proc. IEEE Conf. Computer vision and Pattern Recognition. (2001) 511-518.
Friedman, J., Hastie, T., Tibshirani, R.: Additive logistic regression: a statistical view of boosting. Ann. Statist 28 (2000) 337-407.
Papageorgiou, C., Oren, M., Poggio, T.: A general framework for object detection. In: Proc. Int'l Conf. Computer Vision. (1998).
Tu, Z.: Probabilistic boosting-tree: Leaning discriminative models for classification, recognition, and clustering. In: Proc. Int'l Conf. Computer Vision. (2005).

* cited by examiner

*Primary Examiner* — Daniel Mariam

(57) ABSTRACT

A method for detecting an object of interest in an input image includes the computer-implemented steps of: receiving an image, providing a multi-class pose classifier that identifies a plurality of pose features for estimating a pose of the object of interest, providing a plurality of cascades of serially-linked binary object feature classifiers, each cascade corresponding to different poses of the object of interest in the input image, selecting at least one of the cascades using the estimated pose, and employing the selected cascades to detect instances of the object of interest in the image.

23 Claims, 6 Drawing Sheets

FAST DETECTION OF LEFT VENTRICLE AND ITS CONFIGURATION IN 2D/3D ECHOCARDIOGRAM USING PROBABILISTIC BOOSTING NETWORK

CROSS-REFERENCE TO RELATED APPLICATIONS

This application claims priority to U.S. Provisional Application No. 60/829,936, filed on Oct. 18, 2006, the disclosure of which is incorporated by reference herein.

BACKGROUND OF THE INVENTION

1. Technical Field

The present disclosure relates to a method and system of detecting an object of interest in an input image, and more particularly, to a method and system for detecting the left ventricle of the heart in a 2D/3D echocardiogram.

2. Discussion of Related Art

A doctor can diagnose the health of a patient by examining their medical images and observing unique characteristics of particular objects of interest within those images. For example, a cardiologist needs to be able quickly locate the left ventricle (LV) of the heart in a 2D/3D echocardiogram image to diagnose the health of a patient's heart. One can cut the 3D echocardiogram into several standard 2D slices such as apical four chamber, apical two chamber, and parasternal short axis views. However, such a naive slice cuffing renders planes that have meaningless interpretation because the parameters that represent the LV are unknown. The parameters, such as features, size, location, and orientation of the left ventricle within the echocardiogram image can vary based on several factors. For example, the features, size, location, and orientation of the left ventricle within a heart differs in each patient, the type of ultrasound machine used can vary, and a technician can aim an ultrasound scanning device at the heart of a patient at various angles and locations.

An object detection system can aid a doctor in the quick detection of an object of interest (e.g., the left ventricle) within a medical image, resulting in a more efficient and accurate diagnosis. A current object detector trains offline, a binary classifier that differentiates the object of interest between the background of the input image, The object detector then performs an online search to exhaustively slide a scanning window on the input image to detect instances of the object of interest. It also uses the so-called integral image for efficient evaluation of the detector. The trained classifier may be denoted by posterior probability $\rho(O|I)$. The posterior probability $\rho(O|I)$ of an uncertain proposition is its conditional probability taking empirical data into account. The online search can be mathematically represented by one of the following two equations:

$$\text{find}\{\theta:\rho(O|I(\theta))>0.5;\theta\in\Theta\}, \quad (1)$$

$$\hat{\theta}=\arg\max_{\theta\in\Theta}\rho(O|I(\theta)), \quad (2)$$

where $I(\theta)$ is an image patch parameterized by $\theta$ and $\Theta$ is the parameter space where the search is conducted. One object of interest can be detected in equation (2), while several objects of interest can be detected by equation (1).

The efficiency of the object detector is affected by variations in the scaling and rotation of the object of interest. For example, the left ventricle in one patient can be much larger and oriented at a different angle as compared to another patient. There are three approaches in the literature to deal with rotation variation: the first is to rotate the image, the second is to train different classifiers for different angles or scales, and the third is to train one classifier by pooling together data from all orientations.

In the first approach, for each sampled 3D image, one rotates the volume of the 3D image and computes an integral volume from the rotated volume. For each sampled 2D image, one rotates the 2D image and computes an integral image from the rotated 2D image. However, volume/image rotation and integral volume/image computation are time consuming since they are linearly dependent on the number pixels of the input image.

In the second approach, only one integral image/volume of the input image is computed. Classifiers for only a sparse set of orientations are then tested to meet real time constraints. However, since an object of interest can be at various orientations and scales, it can be difficult to build an accurate object detector without sacrificing speed.

In the third approach, the variation introduced by the rotation is treated as an intra-class variation. However, such treatment significantly complicates appearance variation, rendering a more complex classifier and making it difficult to recover rotation information.

Thus, there is a need for method and system for detecting an object of interest that can quickly estimate the pose of the object of interest (e.g., the left ventricle) at an early stage of image detection. The estimated pose can then be used to simplify the later more complex stages of image detection.

SUMMARY OF THE INVENTION

An exemplary embodiment of the present invention includes a method for detecting an object of interest in an input image. The method includes the computer-implemented steps of: receiving an image, providing a multi-class pose classifier to estimate a pose of an object of interest in the image, providing a plurality of cascades of serially-linked binary object feature classifiers corresponding to different poses of the object of interest in the image, selecting at least one of the cascades using the estimated pose, and employing the selected cascades to detect instances of the object of interest in the image.

The multi-class pose classifier identifies a plurality of pose features for estimating the pose of the object of interest. Each binary classifier identifies a plurality of object features associated with the object of interest. Each of the classifiers is in sequence in the cascade and respectively has increasing accuracy in identifying the object features.

The selected cascades may be employed to detect instances of the object of interest in the image by placing a working window at different positions in the image such that the image is divided into a plurality of substantially same dimension windows, discarding the subwindows that insufficiently show the object features of the object of interest, and continuing to process through the selected cascade only subwindows having sufficient object features that indicate a likelihood of an instance of the object of interest in the subwindows.

An exemplary embodiment of the present invention includes a method for detecting an object of interest in an input image. The method includes the computer-implemented steps of: receiving an image, providing a plurality of serially-linked hybrid classifiers, and traversing the plurality of serially-linked hybrid classifiers to detect instances of the object of interest in the image.

Each hybrid classifier includes a multi-class pose classifier and a plurality of cascades of serially-linked object feature binary classifiers. The multi-class pose classifier identifies a plurality of pose features for estimating a pose of the object of interest in the image. The plurality of cascades corresponds to different poses of the object of interest in the input image. Each binary classifier identifies a plurality of object features associated with the object of interest. Each of the classifiers is in sequence in the cascade and respectively has increasing accuracy in identifying the object features. Each multi-class pose classifier of a current stage of the link of hybrid classifiers has increased accuracy in identifying the pose features over a previous stage.

The plurality of serially-linked hybrid classifiers may be traversed to detect instances of the object of interest as follows. For each stage of the plurality of serially-linked hybrid classifiers, at least one of the cascades of the current stage is selected using the estimated pose of the current stage, and the selected cascades are employed to detect instances of the object of interest. The selected cascades may be employed to detect instances of the object of interest in the image by placing a working window at different positions in the image such that the image is divided into a plurality of substantially same dimension windows, discarding the subwindows that insufficiently show the object features of the object of interest, and continuing to process through the selected cascade only subwindows having sufficient object features that indicate a likelihood of an instance of the object of interest in the subwindows.

An exemplary embodiment of the present invention includes an object detection system for detecting an object of interest in an input image. The object detection system includes an image scanner and an object detector. The image scanner places a working window at different positions in an image such that the image is divided into a plurality of substantially same dimension subwindows. The object detector provides a multi-class pose classifier to estimate a pose of the object of interest and provides a plurality of cascades of serially-linked binary object feature classifiers corresponding to different poses of the object of interest in the image.

The multi-class pose classifier identifies pose features associated with the object of interest. Each binary classifier identifies a plurality of object features associated with the object of interest. Each of the classifiers is in sequence in the cascade and respectively has increasing accuracy in identifying the object features.

The object detector selects one or more of the cascades using the estimated pose and employs for each subwindow, the selected cascade to detect instances of the object of interest in the image.

The object detection system may further include an image integrator, which computes an integral image representation of the input image. The object detection is system may further include a training server which trains each of the classifiers in a learning phase on a training set. The object detector may provide to a computer output device an output image that identifies the detected instance of the object of interest based on the employing of the multi-class pose classifier and the plurality of cascades of serially-linked binary object feature classifiers.

These and other exemplary embodiments of the present invention will be described or become more apparent from the following detailed description of exemplary embodiments, which is to be read in connection with the accompanying figures.

BRIEF DESCRIPTION OF THE DRAWINGS

Exemplary embodiments of the invention can be understood in more detail from the following descriptions taken in conjunction with the accompanying drawings in which.

DETAILED DESCRIPTION OF THE EXEMPLARY EMBODIMENTS

In general, exemplary embodiments for systems and methods for detecting an object of interest within an input image will now be discussed in further detail with reference to illustrative embodiments of FIGS. 1-6. This invention may, however, be embodied in different forms and should not be construed as limited to the embodiments set forth herein. Rather, these embodiments are provided so that this disclosure will be thorough and complete, and will fully convey the scope of the invention to those skilled in the art.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachings herein, is one of ordinary skill in the related art will be able to contemplate these and similar implementations of the present invention.

Figure 1:
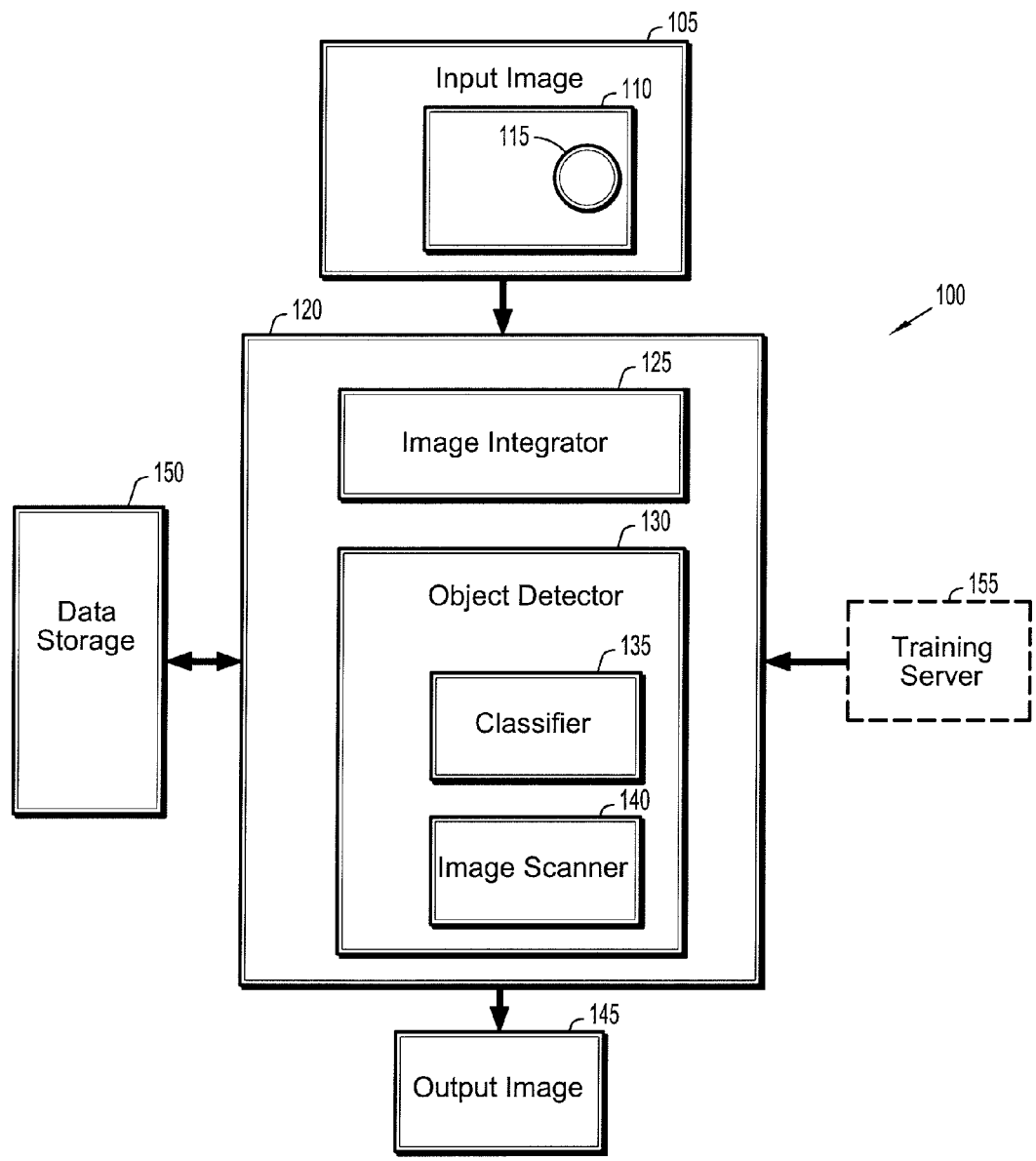
FIG. 1 illustrates a high-level block diagram of an object detection system according to an exemplary embodiment of the present invention.

FIG. 1 illustrates a high-level block diagram of an object detection system according to an exemplary embodiment of the present invention. The object detection system 100 includes a digital processor 120 and data storage 150, and is used to detect an object of interest (e.g., the left ventricle). For example, the object detection system 100 may be used to detect the left ventricle of the heart in a 2D/3D echocardiogram image.

The digital processor 120 hosts and executes an image integrator 125 and an object detector 130 in working memory. The input image 105 is a digital image composed of bits (e.g., pixels) based on a photographic image, an image from a video, a computer created image, or other digital image. For example the input image 105 may be an echocardiogram. The output image 145 is a digital image composed of bits based on the input image 105, with additional markings, such as highlighting, to indicate a detected instance of the object of interest.

An instance of the object of interest 115 is displayed in a subwindow 110 of the input image 105. The subwindow 110 is a part of the input image 105 and is based on a geometric shape (e.g., rectangle, square, or other shape). The object of interest 115 is recognizable from the background of the input due to its distinct features.

The image integrator 125 is a software program, routine, object, module, firmware or hardware entity that creates an integral image representation of the input image 105. The object detector 130 is a software program, routine, object, module, or firmware or hardware entity that detects an instance of an object in an input image 105 or part of an input image 105 (e.g., patches or subwindows 110). The object detector 130 includes a classifier 135 based on one or more features of the object of interest. The classifier 135 evaluates an input image 105 or part of an input image 105 to determine if an instance of the object of interest 115 is detected based on the presence of one or more of the features or not detected based on an absence of one or more of the features. In an exemplary embodiment of the present invention, the object detector 130 uses a network of classifiers comprising a multi-class pose classifier and one or more cascades of serially-linked binary object feature classifiers (See FIG. 4). In a further exemplar embodiment of the present invention, the object detector 130 uses a network of classifiers comprising a cascade of serially-linked hybrid classifiers, where each hybrid classifier includes a multi-class pose classifier and one or more cascades of serially-linked binary object feature classifiers (See FIG. 6). The object detector 130 includes an image scanner 140 that processes the input image 105 to divide the input image 105 into smaller working pieces or subwindows 110.

The data storage 150 is a data storage device (e.g., one or more disk drives) associated with the object detection system 100 that stores data as needed for the digital processor 120, such as the input image 105, working copies of the input image 105 as it is processed, and the output image 145.

The training server 155 is a digital computer, such as a network server, that is used in an offline learning phase to train the classifier 135 based on a training data set that includes many digital images with predetermined or known instances of the object of interest 105 as well as negative example images showing what the object is not. The object detector 130 then uses the classifier 135 to detect an instance of the object in the input images 105 without requiring further input from the training server 155. The training server 155 is optional, as the functions of the server could be performed directly by the processor 120.

Figure 2:
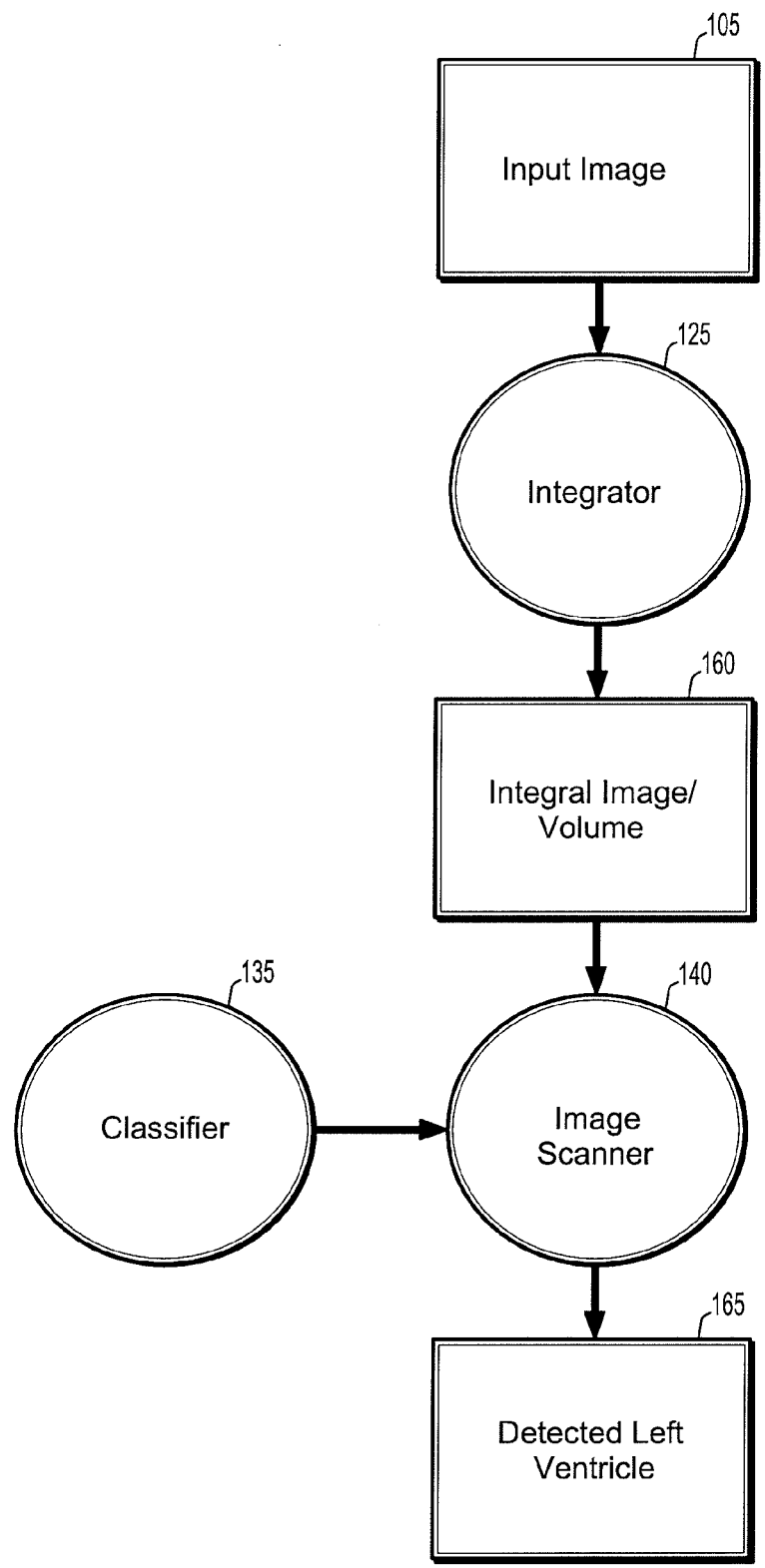
FIG. 2 is a schematic diagram of the flow of control for the object detector 130 of FIG. 1.

FIG. 2 is a schematic diagram of the flow of control for the object detector 130 of FIG. 1. The object detection system 100 receives the input image 105, which may be received over a network, from a photographic or video camera, from data storage 150, or from another suitable source of digital images. The image integrator 125 computes the integral image/volume 160, which is a representation of the input image 105. The image scanner 140 then scans the integral image/volume 160 to divide the integral image/volume 160 into subwindows 110 and uses the classifier 135 to classify each subwindow 110 in the integral image/volume 160 as having detected the object of interest (e.g., the left ventricle) or not. The object detector 135 then outputs an output image 145 with the object of interest highlighted (e.g., with a bounding box surrounding each the detected left ventricle 165).

Figure 3:
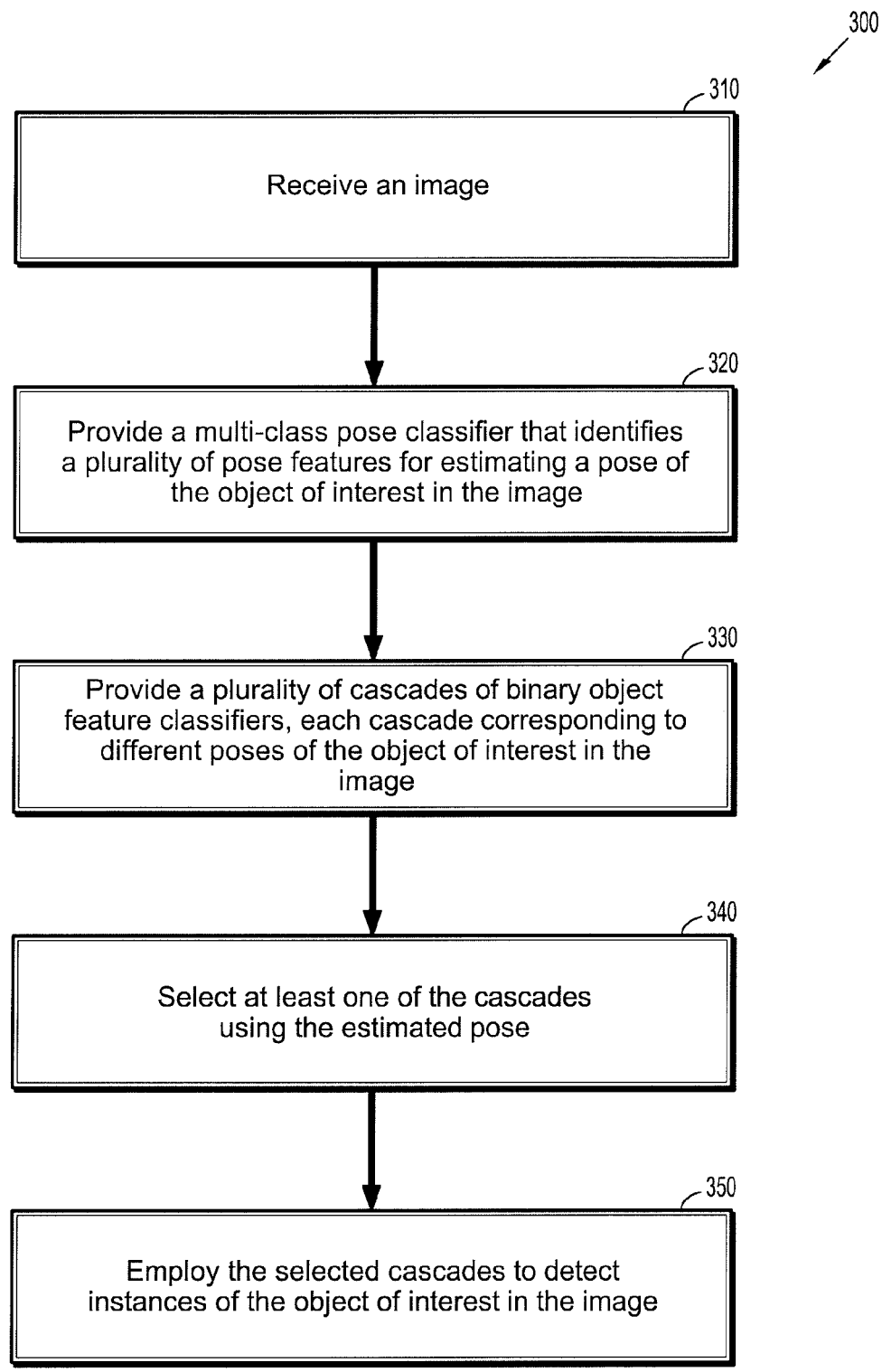
FIG. 3 illustrates a method for detecting objects of interest in an input image according to an exemplary embodiment of the present invention.

An exemplary embodiment of the present invention includes a method for detecting the object of interest 115 in the input image 105. Referring to FIG. 3, the method 300 includes the computer-implemented steps of: receiving an image (S310), providing a multi-class pose classifier that identifies a plurality of pose features for estimating a pose of the object of interest in the image (S320), providing a plurality of cascades of binary object feature classifiers each cascade corresponding to different poses of the object of interest in the input image (S330), selecting at least one of the cascades using the estimated pose (S340), and employing the selected cascades to detect instances of the object of interest in the image (350). The employing may further includes the steps of placing a working window at different positions in the image such that the image is divided into a plurality of substantially same dimension subwindows, discarding the subwindows that insufficiently show the object features of the object of interest and continuing to process through the selected cascade only subwindows having sufficient object features that indicate a likelihood of an instance of the object of interest in the subwindows.

Figure 4:
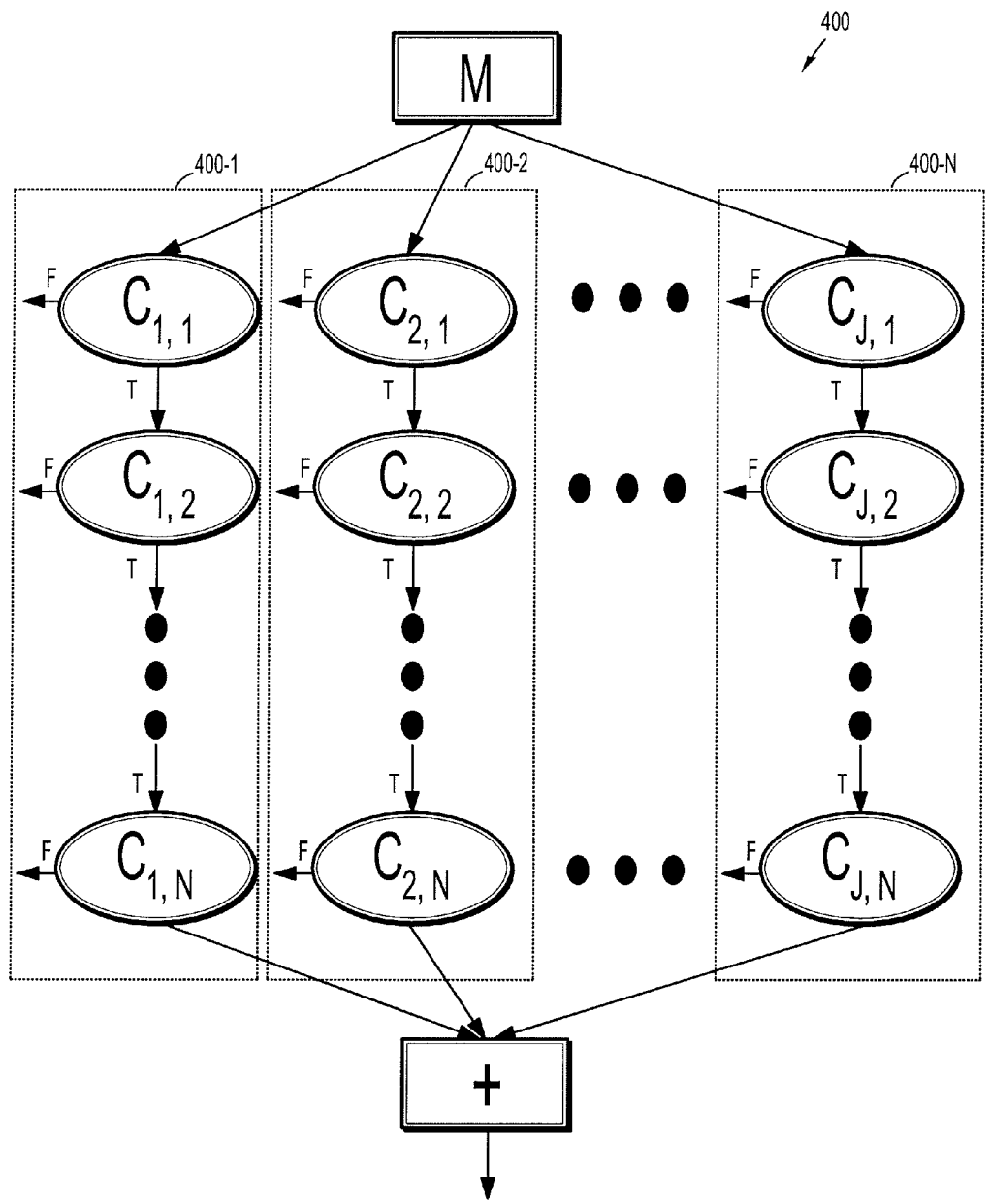
FIG. 4 illustrates an embodiment of the classifier of FIG. 1 according to an exemplary embodiment of the present invention.

In an exemplary embodiment of the present invention, the classifier 135 of FIG. 1 corresponds to a network of classifiers 400 shown in FIG. 4. The network 400 includes a multi-class pose classifier M and several cascades of serially-linked binary object feature classifiers $\{C_{1,1}, C_{1,2}, \ldots, C_{1,N}\}$ 400-1, $\{C_{2,1}, C_{2,2}, \ldots, C_{2,N}\}$ 400-2, ..., and $\{C_{J,1}, C_{J,2}, \ldots, C_{J,N}\}$ 400-N. Each of the cascades 400-1, 400-2, ..., and 400-N corresponds to a different possible pose of the object of interest 115. A pose is considered to be an angular and/or scaling variation in the object of interest 115. The multi-class pose classifier M estimates the pose of the object of interest 115. The pose estimation is a probability distribution of all possible poses. For example, the pose estimation could indicate that the object of interest 115 is more likely to be at 10, 50, and 80 degree poses and/or scaling factors of 0.5, 0.8 and 1.2 times some predefined image size. One can then uses this knowledge to traverse the 10, 50 and 80 degree so poses and/or 0.5, 0.8, and 1.2 scaling poses of the several cascades of serially-linked binary object feature classifiers for further processing to detect the object of interest 115.

A simple pose estimation is known as a one parameter pose estimation and includes only one parameter, such as angle. The one parameter pose estimation can be estimated by learning a probability $\rho(\beta|I)$, where $\beta$ is the pose and I is the image. The probability $\rho(\beta|I)$ can be used to estimate the pose $\beta$ accurately to avoid early difficult decisions that can cause errors in subsequent tasks. The probability $\rho(\beta|I)$ can be approximated using discretized probability $\rho(\beta_j|I)$ using a discrete set of parameters $\{\beta_1, \beta_2, \beta_3, \ldots, \beta_J\}$ and a boosting algorithm such as, LogitBoost or AdaBoost The LogitBoost algorithm fits an additive symmetric logistic model by the maximum likelihood principle. The maximum likelihood principle states that the set of model parameters that maximize the apparent probability of a set of observations is the best set possible. The fitting proceeds iteratively to select weak learners and combines them into a strong classifier. The output of the LogitBoost algorithm is a set of J response functions $\{F_j(x); j=1, \ldots, J\}$ and each response function $F_j(x)$ is a linear combination of a set of weak learners. The combination is defined by the following equation 3:

$$F_j^n(x) = \sum_{i=1}^{n} f_{j,i}(x), \qquad (3)$$

where $f_{j,i}(x)$ is a weak learner and n is the number of weak learners. The LogitBoost algorithm provides a natural way to calculate the posterior distribution of a class label defined by the following equation 4;

$$p_j^n(x) = \frac{\exp(F_j(x))}{\sum_{k=1}^{J} \exp(F_k(x))} = \frac{\exp(F'_j(x))}{1 + \sum_{k=1}^{J} \exp(F'_k(x))}, \quad (4)$$

where $F_j(x)=F_j(x)-F_0(x)$. The pose parameter $\beta$ can be inferred by using the minimum mean square error (MMSE) estimator, which is a conditional mean defined by the following equation 5:

$$\beta_{MMSE} = \int_\beta \beta \rho(\beta|I)d\beta \approx \Sigma_j \beta_j \rho(\beta_j|I). \quad (5)$$

Equation 5 gives a better estimate than a maximum posterior (MAP) estimate from a discrete set of possible values of $\beta$ because the MMSE estimate can interpolate in between the values in the discrete set. The MAP estimator is defined by the following equation 6:

$$\hat{\beta}_{MAP} = \max_\beta \rho(\beta|I) \approx \max_{\{\beta_i,\ldots,\beta_j\}} \rho(\beta_j|I). \quad (6)$$

Figure 5:
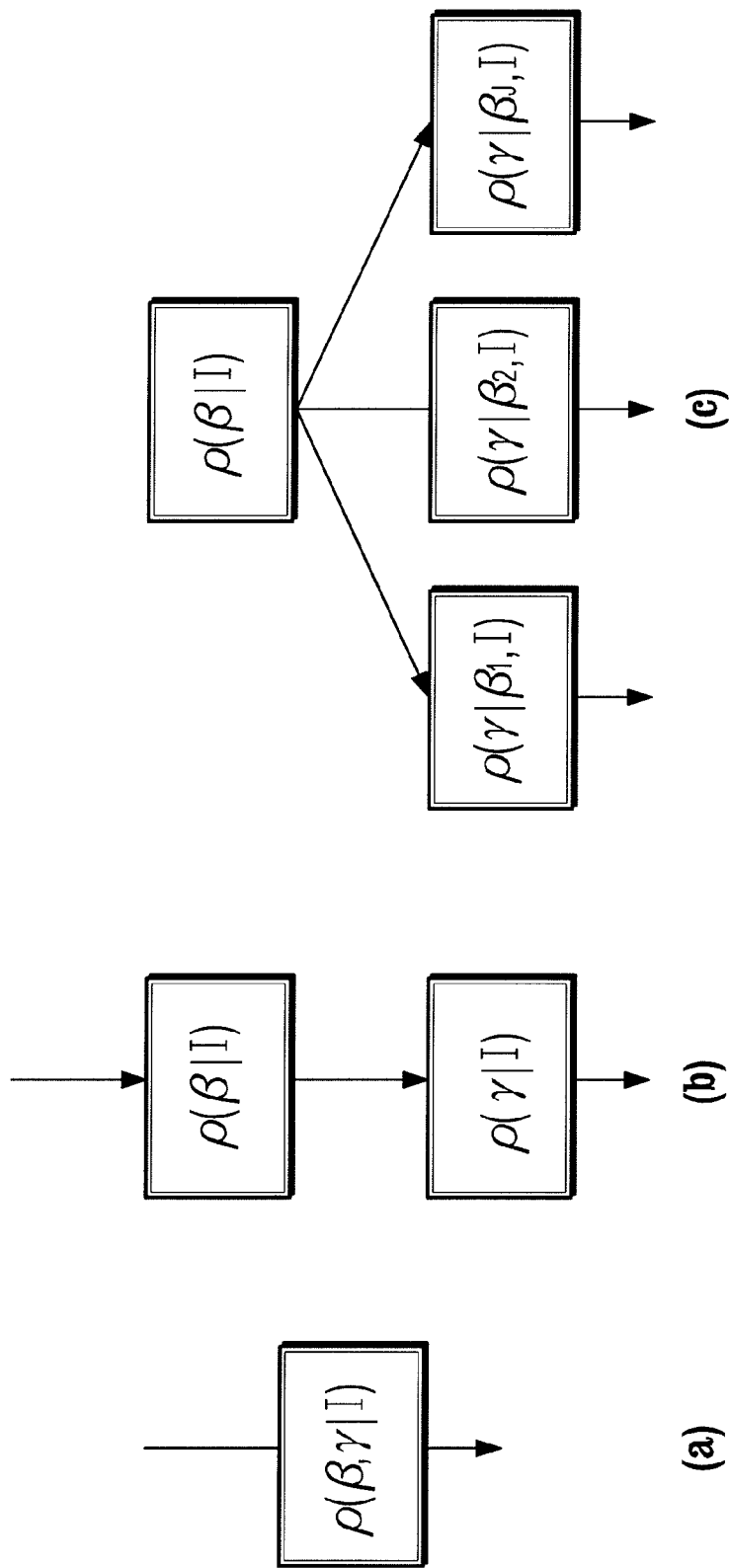
FIG. 5 illustrate exemplary graphical structures used for estimating pose.

The LogitBoost algorithm can also be used to estimate a multiple pose parameter, such as one covering variations in both angle and scale. For example, assume angle corresponds to a first parameter $\gamma$ and scale corresponds to a second parameter $\beta$. The probability of the two parameter pose parameter $\rho(\beta,\gamma|I)$ needs to be estimated from the image I. FIG. 5 is a graphical illustration of three possible structures that can be used to fulfill the estimation task.

In a type-a structure of FIG. 5(a), the combination of $\beta$ and $\gamma$ is treated as a single variable that is trained directly. This approach is structurally simple and has good performance when the number of the combination states is small. However, when the number of combination states is large or the appearance variations caused by both parameters are too complex to learn using a single classifier, this approach may give a poor performance. A divide-and-conquer strategy is more efficient when the number of combination states is large. Such a strategy can be used to estimate parameters sequentially by using multiple multi-class classifiers.

For a type-b structure of FIG. 5(b), the pose parameters $\beta$ and $\gamma$ are treated independently. To train $\rho(\beta|I)$ or $\rho(\gamma|I)$, the variation in $\beta$ or $\gamma 0$ is treated as an intra-class. The joint distribution is approximated by the following equation 7:

$$\rho(\beta,\gamma|I) \approx \rho(\beta|I)*\rho(\gamma|I). \quad (7)$$

For a type-c structure of FIG. 5(c) a conditional probability law is applied, denoted by the following equation 8:

$$\rho(\beta,\gamma|I) = \rho(\gamma|\beta,I)*\rho(\beta|I). \quad (8)$$

The type-c structure can be represented as a tree. A root multi-class classifier is trained to learn $\rho(\beta|I)$ by treating the variation $\gamma$ as an intra-class. Each child node corresponds to the conditional probability $\rho(\gamma|\beta_j,I)$ for a discrete state $\beta_j$. To compute $\rho(\beta,\gamma|I)$ efficiently, cascades whose probability $\rho(\beta|I)$ is below a predetermined threshold are omitted. The choice of the root parameter for the type-c structure influences the overall performance, because the amount of the image appearance variations caused by the two parameters is not the same. The parameter that causes larger appearance variation should preferably be the root node, making the learning of $\rho(\beta|I)$ easier and resulting in a better division of the pose space. The properties of the data determine the type of structure used. For example, if the number of poses is small and the appearance variation can be sufficiently captured by one classifier, a type-a structure is preferably used, otherwise a type-c structure is preferably used.

As discussed above, the estimated pose is used to select one or more of the several cascades of serially-linked binary object feature classifiers of FIG. 4 for further processing. Each binary classifier analyzes a subwindow 110 of the input image 105 for unique characteristics or features that are typical of the object of interest 115 and determines whether or not the subwindow 110 has those features. The initial classifiers $C_{1,1}$-$C_{J,1}$ can eliminate a large number of negative examples (e.g., subwindows 110 without instances of the object of interest 115) with very little processing. The initial is classifiers $C_{1,1}$-$C_{J,1}$ utilize a limited number of features (e.g., one to five features) to identify a large percentage, such as 50%, of the initial set of subwindows 110, which are unlikely to have any instances of the object of interest 105. For example, if the input image 105 is a photograph with a large area representing a white wall, then the initial classifiers $C_{1,1}$-$C_{J,1}$ eliminates the subwindows 105 that cover the area of that white wall. In FIG. 4, this elimination process is indicated by the letter "F" for "False", and the rejected set of subwindows 110 indicates those subwindows 110 eliminated by the respective classifier. The retention of windows is indicated by the letter "T" for "True", meaning that a respective classifier has passed those subwindows 110 that are not eliminated.

The cascades 400-1, 400-2, . . . 400-N illustrated in FIG. 4 are mathematically represented by a probabilistic boosting network (PBN). The PBN is probabilistic in that it leverages the fundamental law of total probability to compute the probability of being object O. The probability is denoted as $\rho(O|I)$ and is defined by the following equation 8:

$$\rho(O|I) = \int_{\gamma \in \tau} \rho(O|I,\gamma)\rho(\gamma|I)d\gamma, \quad (8)$$

where $\gamma$ denotes the parameter of variation, which resides in the space $\tau$, $\rho(O|I,\gamma)$ is the binary classifier specific to a particular variation parameter $\gamma$ and $\rho(\gamma|I)$ is the posterior probability of being $\gamma$ given the image I. Equation 8 can be approximated using a discrete set of parameters $\Gamma=\{\gamma_1, \gamma_2, \ldots, \gamma_n\}$ using the following equation 9:

$$\rho(O|I) \approx \sum_{n=1}^{N} \rho(O|I,\gamma_n)\rho(\gamma_n|I), \quad (9)$$

where $\rho(\gamma_n|I)$ is a multi-class classifier.

The PBN also uses boosting. The probability $\rho(\gamma_n|I)$ is implemented using the multiclass LogintBoost algorithm. The classifier $\rho(O|I,\gamma_n)$ is implemented using the cascade of boosted binary classifiers which is able to deal with numerous negatives and eliminate them as early as possible during testing. To implement the binary classifier in each cascade, one can use AdaBoost, binary LogitBoost, or other variants.

Assume that each cascade has Ci stages as in FIG. 4. The $\rho(O|I,\gamma_n)$ is computed using the following equation 10:

$$\rho(O \mid I, \gamma_n) = \prod_{c=1}^{Cn} p_c(O \mid I, \gamma_n), \quad (10)$$

where $\rho_c(O|I,\gamma_n)$ is the binary classifier for the cth cascade. The complexity of the classifier $\rho_c(O|I,\gamma_n)$ increases as the stage proceeds deeper (e.g. c becomes larger). Without loss of generality, we assume that C1=C2= . . . =CN=C. For example, for Cn<C, $\rho_c(O|I,\gamma_n)$ can be set to 1 if c>Cn. Boosting operates as a feature selection oracle to form a committee, where only those features relevant to final classification are selected into the committee. Fast evaluation of the probabilities may be provided when Haar-like local rectangle features are used. Haar-like local rectangles are filters that provide local high frequency components in various directions and resolutions.

The network of classifiers 400 of FIG. 4, which includes both the multi-class pose classifier M and the cascades 400-1, 400-2, . . . , 400-N is mathematically represented by the following equation 11:

$$\rho(O \mid I, \gamma_n) \approx \sum_{n=1}^{N} \prod_{c=1}^{C} p_c(O \mid I, \gamma_n)\rho(\gamma_n \mid I). \quad (11)$$

Using this structure, the negatives can be rejected quickly when they flow through the network 400 while the positives traverse through the several cascades. The probability p(O|I) can be computed by combining the evidence from these cascades using equation 11. The network 400 is efficient because only a few promising cascades indicated by the pose estimation probability $\rho(\gamma_n|I)$ estimated by the multi-class pose classifier M are tested.

Figure 6:
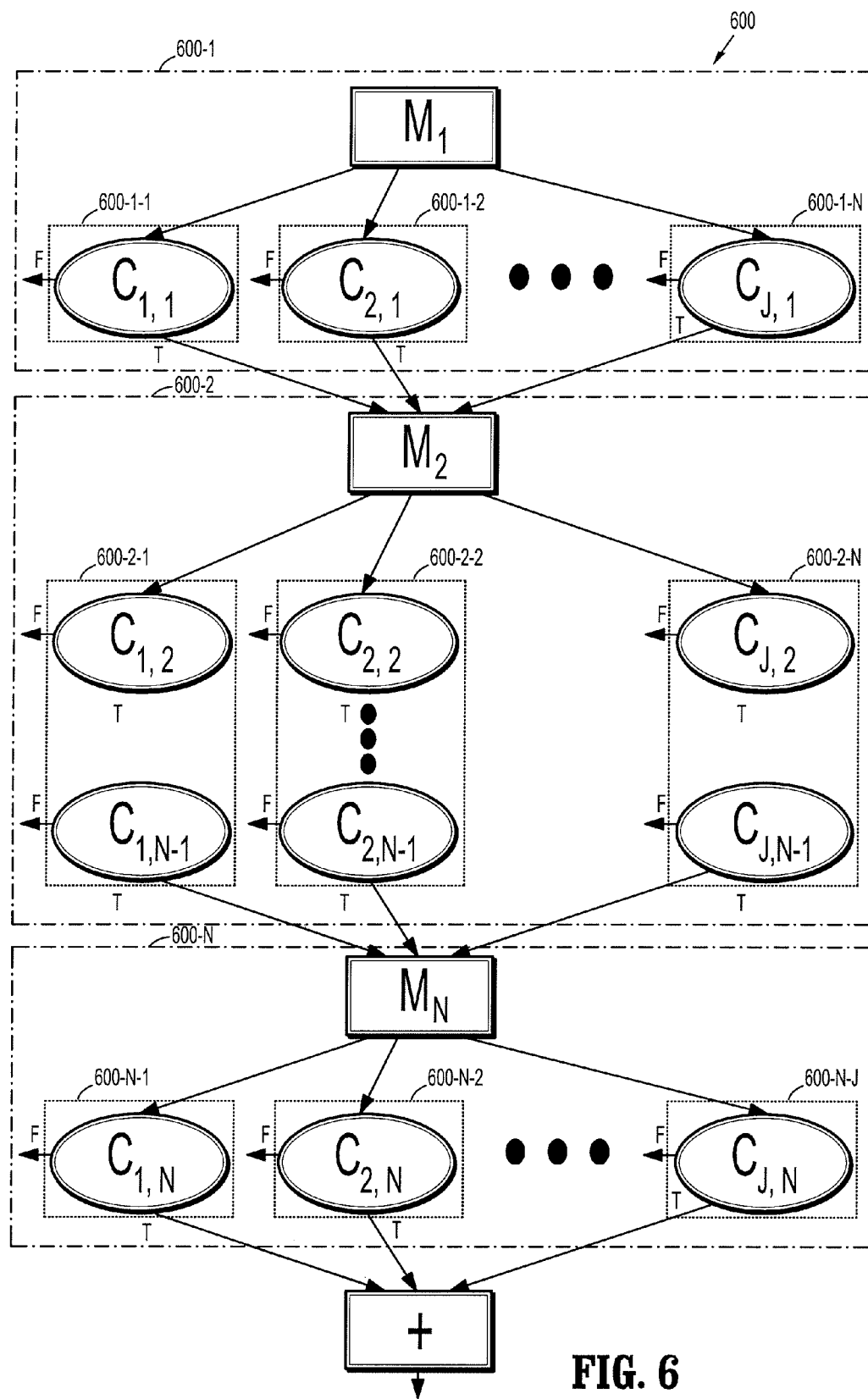
FIG. 6 illustrates an embodiment of the classifier of FIG. 1 according to an exemplary embodiment of the present invention.

In another exemplary embodiment of the present invention, the classifier 135 of FIG. 1 corresponds to a network of classifiers 600 shown in FIG. 6. The network 600 includes a cascade of serially-linked hybrid classifiers 600-1, 600-2, . . . , 600-N. Each of the hybrid classifiers 600-1, 600-2, . . . , 600-N includes a multi-class pose classifier $M_1$, $M_2$, . . . , $M_n$ and cascades of one or more serially-linked binary object feature classifiers {600-1-1, 600-1-2, . . . , 600-1-N}, {600-2-1, 600-2-2, . . . , 600-2-N}, . . . , {600-N-1, 600-N-2, . . . , 600-N-J}, respectively. The multi-class pose classifiers $M_1$, $M_2$, . . . , $M_n$ of FIG. 6 are similar to the single multi-class classifier M of FIG. 4. The multi-classifier classifier M is essentially broken down into several stages with increasing complexity to generate the multi-class pose classifiers $M_1$, $M_2$, . . . , $M_n$. The computation of $\rho(\gamma_n|I)$ is accordingly broken down into several stages according to the following equation 12:

$$\rho(\gamma_n \mid I) = \prod_{c=1}^{C} p_c(\gamma_n \mid I), \quad (12)$$

where $\rho(\gamma_n|I)$'s are a series of multi-class classifiers with increasing complexity as c increases. The resulting probability for $\rho(O|I)$ is calculated using the following equation 13:

$$\rho(O \mid I) = \sum_{n=1}^{N} \prod_{c=1}^{C} p_c(\gamma_n \mid I), \quad (13)$$

which corresponds to the network 600 shown in FIG. 6. The network 600 shown in FIG. 6 rejects negatives faster than the network 400 structure shown in FIG. 4, because less complex multi-class classifiers are passed. Since negatives can be numerous, the second network 600 can have a lower over-all processing time.

A left ventricle (LV) may be detected in an echocardiogram using an object detector and the following sample data, according to an exemplary embodiment of the present invention. Assume 50 3D echocardiogram volumes are used in training and 22 echo cardiogram volumes are used in testing. During preprocessing, the volumes can be down-sampled into a quarter the size of the original one, which gives a volume of size 54×62×67. A local coordinate system may be built for each volume, with its center at the LV center and its z-axis along the long axis of the LV. Since the LV is roughly symmetric along its long axis, the rotation can be treated along the z-axis as an intra-class variation by augmenting the volumes rotated along the z-axis at −40, −20, 0, 20, and 40 degrees. The rotations along the x-axis and the y-axis can be divided into angles of −20, 0 and 20, which require a 9-class classifier to be learned. Each angle may be randomly perturbed by a small amount of voxels (e.g., less than 3 voxels) around the LV center to collect more positives to increase the robustness of the LV detection. The 9-class classifier can be learned using the LogitBoost algorithm, which can include, for example, 61 3D Haar-like features. The 9-class classifier may be tested using the 22 testing volumes to generate 9 orientations. Exemplary results of the testing are illustrated below in table 1.

TABLE 1

| Rank  | 1    | 2    | 3    | 4    | 5    | 6    | 7   |
|-------|------|------|------|------|------|------|-----|
| Accur | 76.9 | 92.8 | 97.1 | 98.4 | 99.4 | 99.8 | 100 |

In the exemplary results, the classification accuracy of the LogitBoost multi-class classifier is 76.9% using the top 1 match. However the classification accuracy improves to 97.1% using the top 3 matches, which means that by exploring the top 3 cascades in a network 600 structure like FIG. 6, there is approximately a 3% chance of making an error.

Each testing volume may be randomly rotated in the range of −30 to 30 degrees along the x-axis, −30 to 30 degrees along the y-axis, and −45 to 45 degrees along the z-axis to synthesize 25 volumes for measuring performance of the PBN. The following five approaches are compared: (1) a rotation-invariant detector trained by pooling all rotated data together, (2) a parallel structured detector, (3) exploring only the most probable cascade of a network structured PBN detector according to FIG. 4, (4) exploring the top three cascades of network structured PBN detector according to FIG. 4, and (5) a network structured PBN detector according to FIG. 6. Exemplary test results for these approaches are presented below in table 2.

TABLE 2

| | Median abs. error | | | | |
|---|---|---|---|---|---|
| | 1st Appr | 2nd Appr | 3rd Appr | 4th Appr | 5th Appr |
| Computation (sec) | 0.6162 s | 0.9148 s | 1.0340 s | 1.2052 s | 0.5625 s |
| Translation (voxel) | 1.7368 | 2.3528 | 1.5187 | 1.4812 | 1.4697 |
| Angle $\theta_x$ (degree) | N.A. | 4.9843 | 4.5200 | 3.5192 | 3.6885 |
| Angle $\theta_y$ (degree) | N.A. | 4.7819 | 4.5709 | 3.5921 | 3.8347 |

As shown by the exemplary test results of table 2, the fifth approach achieves the best overall precision and speed.

Although the illustrative embodiments have been described herein with reference to the accompanying drawings, it is to be understood that the present invention is not limited to those precise embodiments, and that various other changes and modifications may be affected therein by one of ordinary skill in the related art without departing from is the scope or spirit of the invention. All such changes and modifications are intended to be included within the scope of the invention.

What is claimed is:

1. A method for detecting an object of interest in an input image, comprising the computer-implemented steps of:
   a multi-class pose classifier estimating a pose of an object of interest within an input image based on a plurality of pose features;
   selecting at least one of a plurality of cascades of serially-linked binary object feature classifiers, wherein each cascade represents a different pose, and the poses represented by the selected ones are similar to the estimate pose, each binary object feature classifier identifies at least one object feature associated with the object of interest, and classifiers in sequence in each cascade have respectively increasing accuracy in identifying the object features; and
   employing the selected cascades to detect an instance of the object of interest in the image.

2. The method of claim 1, wherein the employing comprises:
   placing a working window at different positions in the image such that the image is divided into a plurality of substantially same dimension subwindows;
   discarding the subwindows that insufficiently show the object features of the object of interest; and
   continuing to process through the selected cascades only subwindows having sufficient object features that indicate a likelihood of an instance of the object of interest in the subwindows.

3. The method of claim 1, wherein the estimating of the pose comprises learning a probability of the pose using one of a LogitBoost and an AdaBoost algorithm.

4. The method of claim 1, wherein the pose features are Haar-like local rectangle features.

5. The method of claim 1, wherein the pose comprises an angle of the object of interest within the image.

6. The method of claim 1, wherein the pose comprises a scaling factor of the object of interest relative to an image of a predefined size.

7. The method of claim 5, wherein the pose further comprises a scaling factor of the object of interest relative to an image of a predefined size.

8. The method of claim 1, wherein the object of interest is the left ventricle of the heart.

9. The method of claim 1, wherein the image is an echocardiogram.

10. A method for detecting an object of interest in an input image, comprising the computer-implemented steps of:
    a first multi-class pose classifier estimating a first pose of an object of interest with a first accuracy within an input image based on a plurality of pose features;
    selecting at least one of a plurality of first object feature binary classifiers, wherein each first binary classifier represents a different pose, and the poses represented by the selected ones are similar to the estimated first pose, and each first binary classifier identifies at least one object feature associated with the object of interest with a second accuracy;
    a second multi-class pose classifier estimating a second pose of the object of interest with a third accuracy higher than the first accuracy from outputs of the selected first binary classifiers;
    selecting at least one of a plurality of second binary object feature classifiers, wherein each second classifier represents a different pose, and the poses represented by the selected ones are similar to the second estimate pose, and each second binary classifier identifies at least one object feature associated with the object of interest with a fourth accuracy greater than the second accuracy; and
    employing the selected second binary classifiers to detect the object of interest.

11. The method of claim 10, wherein the employing comprises:
    placing a working window at different positions in the image such that the image is divided into a plurality of substantially same dimension subwindows;
    discarding the subwindows that insufficiently show the object features of the object of interest; and
    continuing to process through the selected cascade only subwindows having sufficient object features that indicate a likelihood of an instance of the object of interest in the subwindows.

12. The method of claim 10, wherein the estimating of the first pose or the second pose comprises learning a probability of the corresponding pose using one of a LogitBoost and an AdaBoost algorithm.

13. The method of claim 12, wherein the first pose or the second pose comprises a scaling factor of the object of interest relative to an image of a predefined size.

14. The method of claim 10, wherein the pose features are Haar-like local rectangle features.

15. The method of claim 10, wherein the first pose or the second pose comprises an angle of the object of interest within the image.

16. The method of claim 10, wherein the first pose or the second pose comprises a scaling factor of the object of interest relative to an image of a predefined size.

17. The method of claim 10, wherein the object of interest is the left ventricle of the heart.

18. The method of claim 10, wherein the image is an echocardiogram.

19. An object detection system for detecting an object of interest in an input image, comprising:
    an image scanner for placing a working window at different positions in an image such that the image is divided into a plurality of substantially same dimension subwindows; and
    an object detector for providing a multi-class pose classifier to estimate a pose of the object of interest in the image and for providing a plurality of cascades of serially-link binary object feature classifiers, where each cascade represents a different pose, the multi-class pose classifier identifying pose features associated with the object of interest, each binary classifier identifying a plurality of object features associated with the object of interest, each of the classifiers in sequence in the cascade respectively having increasing accuracy in identifying the object features, the object detector selecting one or more of the cascades whose poses are similar to the estimated pose and employing for each subwindow, the selected cascades to detect instances of the object of interest in the image.

20. The object detection system of claim 19, further comprising an image integrator, wherein the image integrator computes an integral image representation of the image.

21. The object detection system of claim 19, further comprising a training server, wherein the training server trains each of the classifiers in a learning phase on a training set.

22. The object detection system of claim 19, where in the object detector provides to a computer output device an output image that identifies the detected instance of the object of interest based on the employing of the multi-class pose classifier and the plurality of cascades of serially-linked binary object feature classifiers.

23. A program storage device readable by machine, tangibly embodying a non-transitory computer readable medium for storing a program of instructions executable by the machine to perform method steps for detecting an object of interest in an input image, the method steps comprising:

a multi-class pose classifier estimating a pose of an object of interest within an input image based on a plurality of pose features;

selecting at least one of a plurality of cascades of serially-linked binary object feature classifiers, wherein each cascade represents a different pose, and the poses represented by the selected ones are similar to the estimate pose, each binary object feature classifier identifies at least one object feature associated with the object of interest, and classifiers in sequence in each cascade have respectively increasing accuracy in identifying the object features; and employing the selected cascades to detect an instance of the object of interest in the image.

* * * * *